United States Patent [19]
Rush

[11] Patent Number: 5,647,723
[45] Date of Patent: Jul. 15, 1997

[54] MEMORY WIRE ROBOTIC HAND

[76] Inventor: Joe A. Rush, 275 R63 Hwy. Lot # 8, Norwalk, Iowa 50211

[21] Appl. No.: 557,702

[22] Filed: Nov. 13, 1995

[51] Int. Cl.[6] .............................. B25J 17/00; B25J 18/00
[52] U.S. Cl. ........................ 414/735; 294/111; 901/29; 901/36
[58] Field of Search ................... 414/729, 735; 901/15, 21, 29, 30, 31, 36, 39; 294/111, 86.4; 623/57, 61, 62, 64

[56] References Cited

U.S. PATENT DOCUMENTS

| | | |
|---|---|---|
| 3,694,021 | 9/1972 | Mullen ............................ 901/36 X |
| 4,527,446 | 7/1985 | Borodin ........................... 901/21 X |
| 4,635,985 | 1/1987 | Rooke . |
| 4,715,637 | 12/1987 | Hosoda et al. .................. 901/30 X |
| 4,834,761 | 5/1989 | Walters .......................... 294/111 X |
| 5,219,366 | 6/1993 | Scribner . |
| 5,226,779 | 7/1993 | Yeakley . |
| 5,236,296 | 8/1993 | Ostwald . |
| 5,364,146 | 11/1994 | Brandorff et al. . |
| 5,447,403 | 9/1995 | Engler, Jr. . |

FOREIGN PATENT DOCUMENTS

| | | | |
|---|---|---|---|
| 479739A | 4/1992 | European Pat. Off. ............ 901/29 |
| 1240574 | 6/1986 | U.S.S.R. ........................... 901/21 |

OTHER PUBLICATIONS

Product literature entitled "Nitinol Springs".
Product literature by Mondo–tronics, Inc.

*Primary Examiner*—Donald W. Underwood
*Attorney, Agent, or Firm*—Richard C. Litman

[57] ABSTRACT

A microprocessor controlled robotic hand which uses electrically activated memory wire to provide impetus for and control the movements of the various digits of the hand. The hand is supported by a robotic arm which allows the positioning of the hand in any desired location with the hand in the desired orientation, within the vicinity of the arm support base.

14 Claims, 6 Drawing Sheets

MEMORY WIRE ROBOTIC HAND

BACKGROUND OF THE INVENTION

1. Field of the Invention

The present invention relates to a robotic hand and arm. The robotic hand uses electrically activated memory wire to cause movement of the fingers of the hand.

2. Description of the Prior Art

Robotic grippers, i.e. hands, and arms have found a myriad of uses in manufacturing, materials handling, bomb disposal radioactive decontamination, prosthetic limbs, and materials testing. The illustrated embodiment of the present invention can, for example, be used for the durability testing of gloves among other uses. A number of robotic arms are known in the art, however none use memory wire to effect movement of the gripping members of the robotic arm.

U.S. Pat. No. 5,447,403, issued to Charles D. Engler Jr. on Sept. 5, 1995, shows an anatomically correct robotic hand which uses rotating servo motors to pull wires attached to pulleys at the joints of the finger, to effect movement of the fingers. Engler, Jr. does not use memory wire.

U.S. Pat. No. 5,364,146, issued to Alexander Brandorff et al. Nov. 15, 1994, shows a robotic gripper for handling objects of various sizes. The gripper of Brandorff et al. has a vertically movable top paddle attached to a band of flexible sheet material. The sheet material is moved by a drive spool which has carbide balls on its surface which engage holes in the sheet materially Brandorff et al. do not teach or suggest the use of memory wire.

U.S. Pat. No. 5,236,296, issued to Timothy C. Ostwald on Aug. 17, 1993, shows a robotic hand wherein the gripper is actuated by a spring and solenoid arrangement. Ostwald does not teach or suggest the use of memory wire.

U.S. Pat. No. 5,226,779, issued to Lester M. Yeakley on Jul. 13, 1993, shows a robotic hand wherein the gripper is actuated by a spring and solenoid arrangement. Yeakley does not teach or suggest the use of memory wire.

U.S. Pat. No. 5,219,366, issued to Albert W. Scribner on Jun. 15, 1993, shows a prosthetic hand wherein the gripper is actuated by a spring and a motor operated rack and pinion arrangement. In an alternative embodiment, a conventional wire is substituted for the motor operated rack and pinion. Scribner does not teach or suggest the use of memory wire.

U.S. Pat. No. 4,635,985, issued to Paul A. Rooke on Jan. 13, 1987, shows a self-pivoting robotic gripper tool that pivots under the influence of gravity. Rooke does not teach or suggest the use of memory wire.

Product literature entitled "Nitinol Springs", shows a coiled memory wire of the type used in the present invention. This document does not teach or suggest the application of memory wire to a robotic hand.

Product literature by Mondo-tronics, Inc. shows a linear motor using a shape memory alloy spring of the type used in the present invention. This document does not teach or suggest the use of memory wire to bend and straighten the fingers of a robotic hand None of the above inventions and patents, taken either singly or in combination, is seen to describe the instant invention as claimed.

SUMMARY OF THE INVENTION

The present invention is directed to a microprocessor controlled robotic hand which uses electrically activated memory wire to provide impetus for and control the movements of the various digits of the hand. The hand is supported by a robotic arm which allows the-positioning of the hand in any desired location with the hand in the desired orientation, within the vicinity of the arm support base.

Accordingly, it is a principal object of the invention to provide a robotic hand or gripper which uses memory wire to actuate the gripping surfaces.

It is another object of the invention to provide a robotic arm which allows the flexible positioning and orienting of a robotic hand.

It is a further object of the invention to provide a programmable control system which allows the robotic hand and arm to execute a variety of movements suitable for a variety of applications.

Still another object of the invention is to provide a substantially anatomically correct robotic hand.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
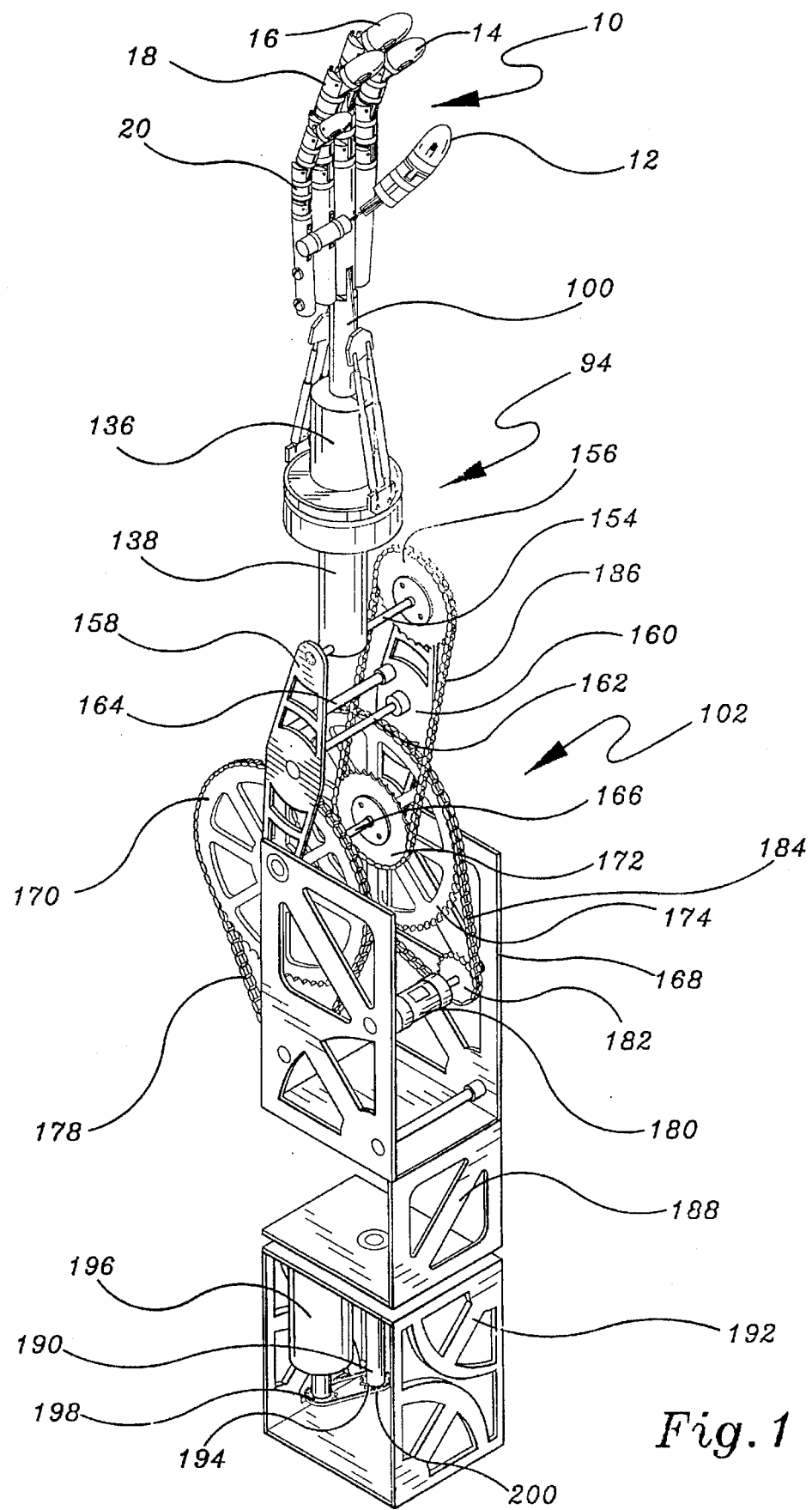
FIG. 1 is a perspective view of the robotic arm and hand of the present invention.
Figure 2:
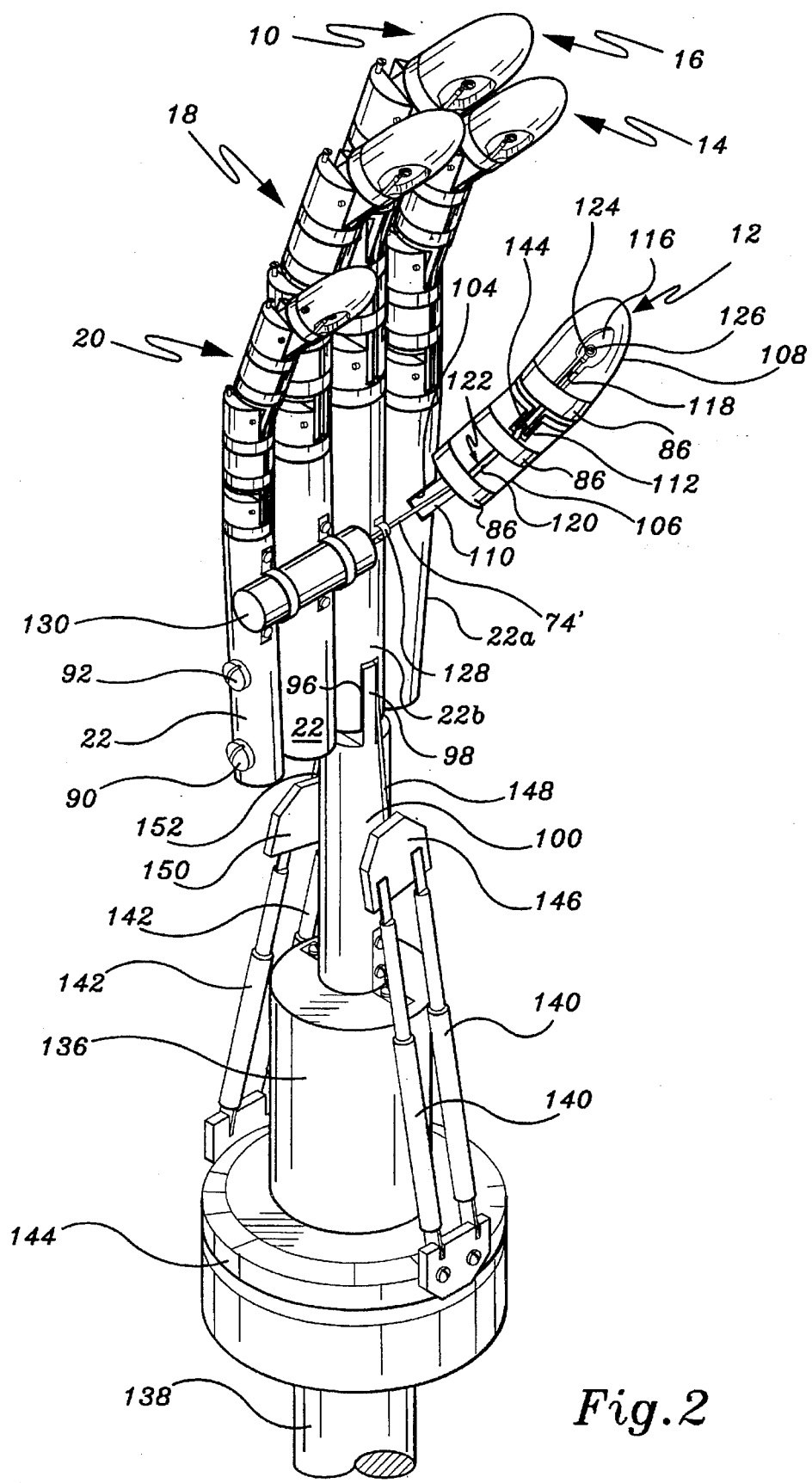
FIG. 2 is a fragmentary perspective view of the robotic hand and forearm of the present invention.
Figure 3:
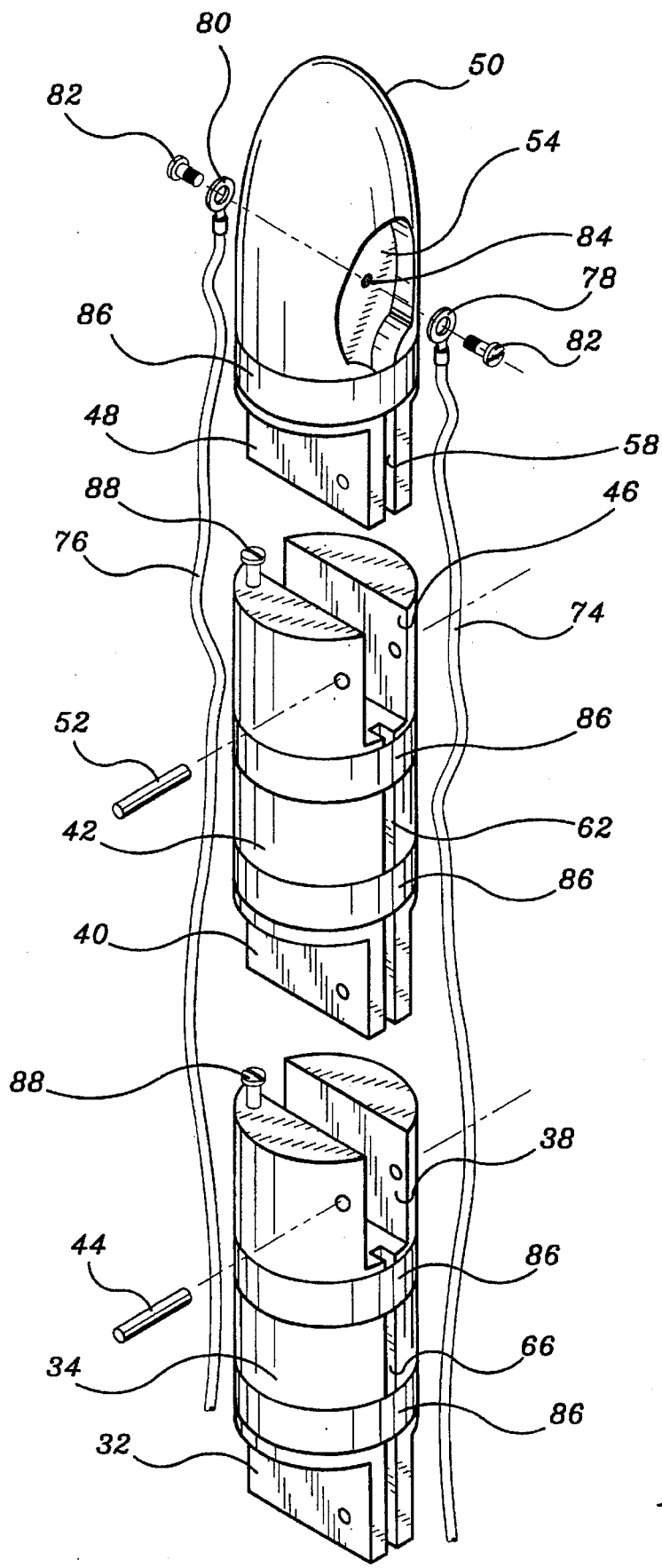
FIG. 3 is an exploded view of the upper three segments of a finger of the robotic hand of the present invention.
Figure 5:
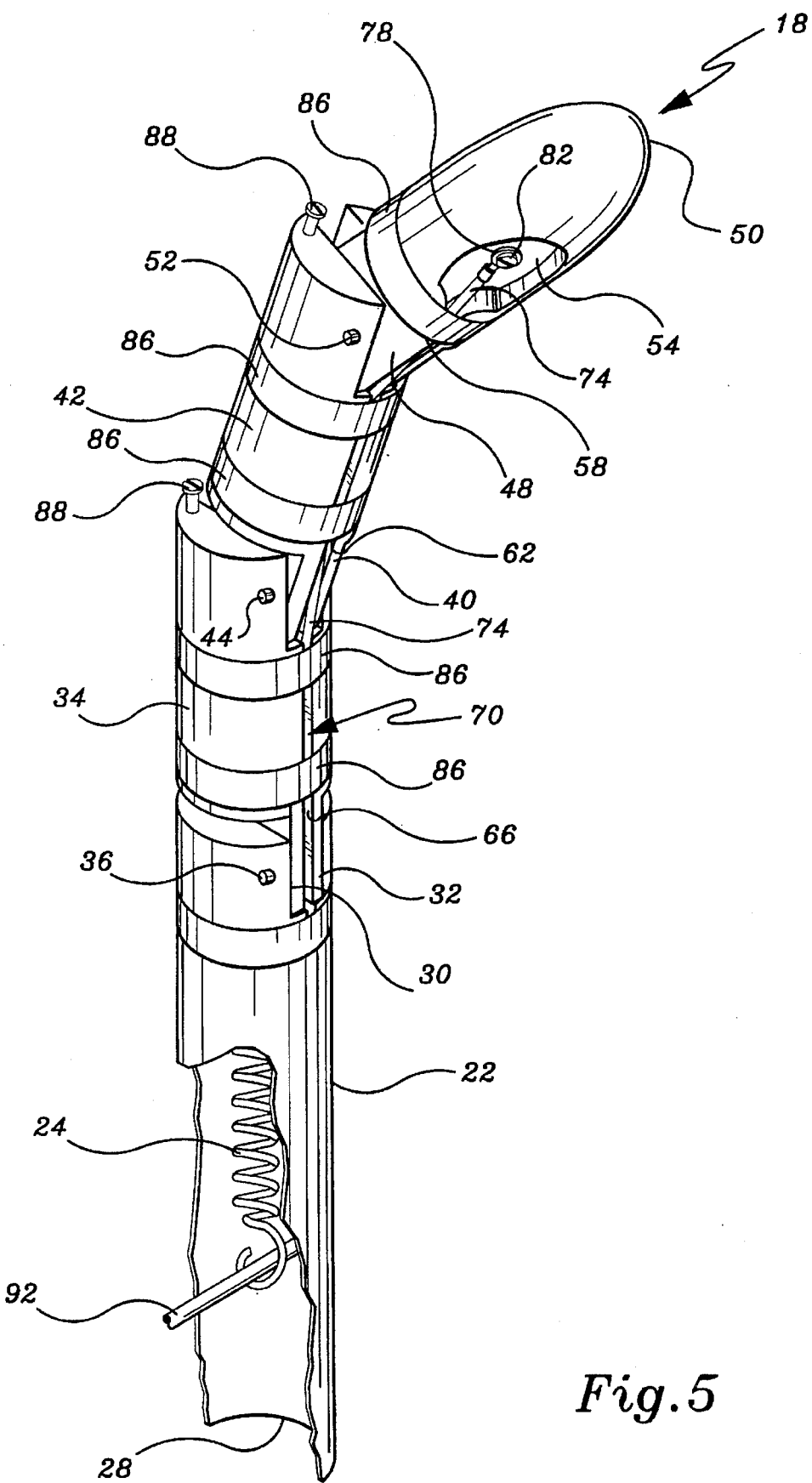
FIG. 5 is a fragmentary view of a finger of the robotic hand of the present invention, shown in isolation and partially broken away to reveal internal detail.
Figure 6:
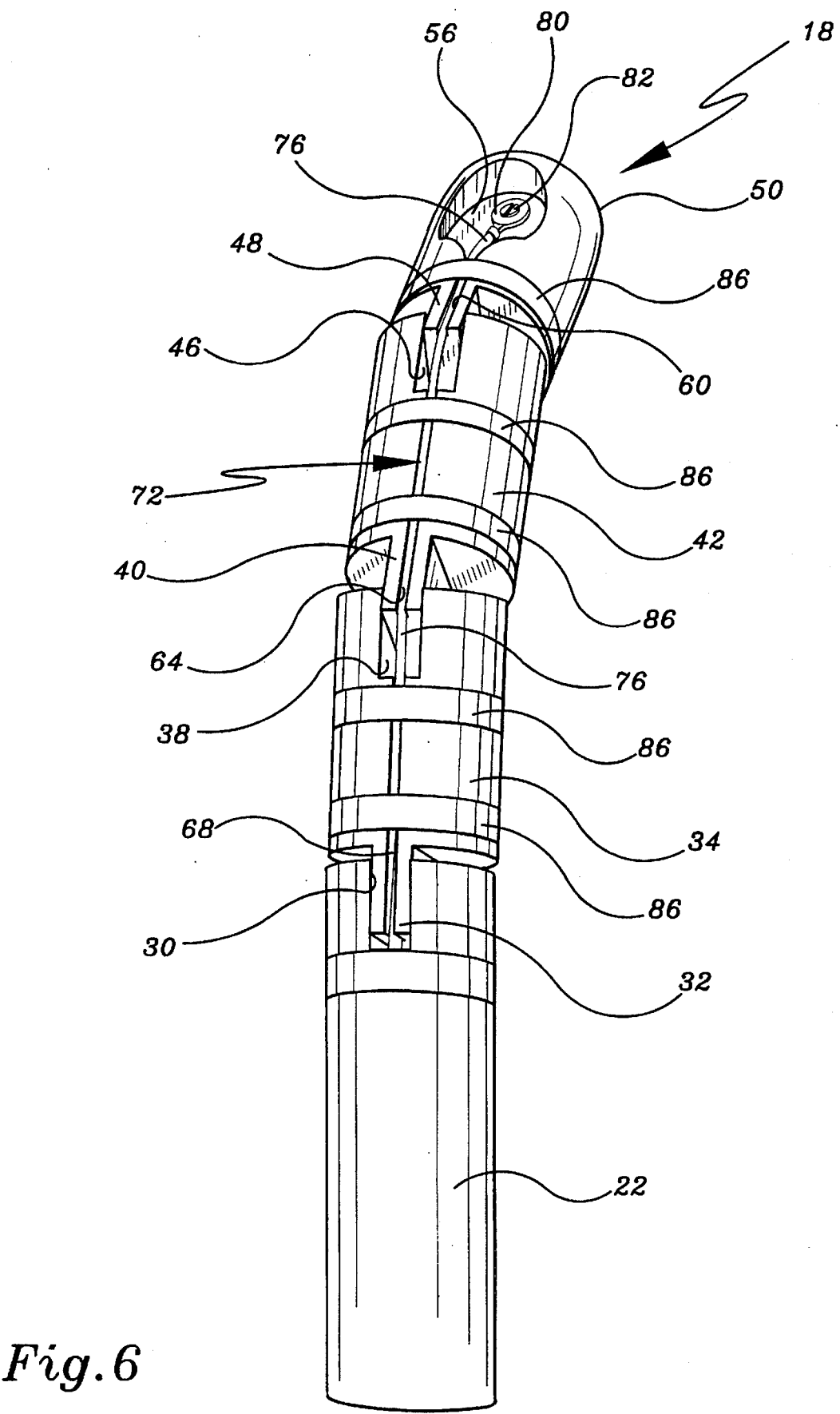
FIG. 6 is a perspective view, from the backhand side, of a finger of the robotic hand of the present invention shown in isolation.

Referring to the drawings, the present invention includes at microprocessor controlled robotic hand 10 which uses electrically activated memory wire to provide impetus for and control the movements of the various digits of the hand 10 Each digit is very similarly constructed. The four fingers each have four segmental while the opposable thumb 12 has two segments. The four fingers include an index finger 14, a middle finger 16, a ring finger 18, and a pinky finger 20. Referring to FIGS. 3, 5, and 6 the construction of the typical finger is seen by examining an isolated, detailed view of the ring finger 18. Each finger has a first segment 22 which resembles the metacarpal bone of the human hand. This metacarpal segment 22 is in the form of a hollow, cylindrical, semi-flexible tube. The metacarpal segment 22 houses two coiled memory wires 24 and 26 (one shown in FIG. 5), and has an open bottom 28. Electrical connections (not shown) can be made to the memory wires in any well known manner, through the bottom opening 28 of the metacarpal segment 22. The top of the metacarpal segment has a slot 30 for receiving a tenon 32 of the second segment 34.

The second segment 34 is pivotally joined to the metacarpal segment 22 by a pivot pin 36 which passes through the slotted end of the metacarpal segment 22 and the tenon 32 of the second segment 34. The second segment 34 simulates the proximal phalanx of the human hand. The second segment 34 is also in the form of a hollow, cylindrical tube made of the same material as the metacarpal segment 22. The end of the second segment 34, distal from the joint to the metacarpal segment 22, has a slot 38 for receiving a tenon 40 of a third segment 42.

The third segment 42 is equivalent to the middle phalanx of the human finger. The third segment 42 is also in the form of a hollow, cylindrical tube made of the same material as the other segments. The third segment 42 is pivotally joined to the second segment 34 by a pivot pin 44 which passes through the slotted end of the second segment 34 and the tenon 40 of the third segment 42. The end of the third segment 42, distal from the joint to the second segment 34, has a slot 46 for receiving a tenon 48 of a fourth segment 50.

The fourth segment 50 is equivalent to the distal phalanx of the human finger. The fourth segment 50 is in the form of rounded ogive with a circular base, and is intended to resemble the tip of the human finger. The fourth segment 50 is also made of the; same material as the other segments. The fourth segment 50 is pivotally Joined to the third segment 42 by a pivot pin 52 which passes through the slotted end of the third segment 42 And the tenon 48 of the fourth segment 50.

Each finger 14, 16, 18, and 20 has a palm side and a backhand side. The finger tip segment 50 has a depression 54 on the palm side and a similar depression 56 on the backhand side. A groove 58 extends from the depression 54 on the palm side along the length of the tenon 48 of the finger tip segment 50. A second groove 10 extends from the depression 56 on the backhand side along the length of the tenon 48 of the finger tip segment 50.

The middle phalanx segment 42 has a groove 62 on the palm side extending from the bottom of the slot 46 receiving the tenon 48 of the finger tip segment 50, to the end of the tenon 40 of the middle phalanx segment 42. A second groove 64 extends from the bottom of the lot 46 receiving the tenon 48 of the finger tip segment 50 to the end of the tenon 40 of the middle phalanx segment 42, on the backhand side of the middle phalanx segment 42. Similarly, the proximal phalanx segment 34 has a groove 66 on the palm side and a second groove 68 on the backhand side thereof. Each of the grooves 66 and 68 extends from the bottom of the slot 38 receiving the tenon 40 of the middle phalanx segment 42, to the end of the tenon 32 of the proximal phalanx segment 34. When the four segments 22, 34, 42, and 50 forming a finger are pivotally connected together, the grooves 58, 62, and 66 on the palm side of each of the distal, middle, and proximal phalanx segments 50, 42, and 34 register with one another, forming a continuous groove 70 running along the palm side of the finger from the depression 54 in the tip segment 50 to the bottom of the slot 30 in the end of the metacarpal segment 22. Similarly, a continuous groove 72 is formed along the backhand side of the distal, middle, and proximal phalanx segments 50, 42, and 34.

Each finger 14, 16, 18, and 20 has a first wire 74 housed in the palm side groove 70, and a second wire 76 housed in the backhand side groove 72. Each wire 74 and 76 terminates in a flat ring 78 and 80 at one end. The ring 78 or 80 for each wire 74 and 76 is anchored in the respective finger tip depression 54 or 56 by a screw 82 passing through the rings 78 or 80 and threadably engaging a hole 84 (one side shown) provided in the finger tip depression 54 or 56. The other end of each wire 74 and 76 passes through a respective opening in the bottom of the slot 30 in the top end of the metacarpal segment 22 and into the hollow interior of the metacarpal segment. The end of each wire 74 and 76 housed in the interior of the metacarpal segment 22 is then fixed to an end of a respective coiled memory wire 24 and 26. The end of each memory wire 24 and 26, distal from the ends attached to the wires 74 and 76, is axially fixed within the hollow interior of the metacarpal segment 22. Metal bands 86 provided at the top of each tenon 32, 40, and 48 and at the bottom of each tenon receiving slot 30, 38, and 46, retain the wires 74 and 76 in their respective grooves 70 and 72.

It should readily be apparent, from the above described construction, that pulling the palm side wire 74 will cause the finger to curl toward the palm of the robotic hand 10. As tension is generated in the palm side wire 74, a torque is generated about each pivot pin in the finger causing adjacent segments to pivot relative to one another, i.e. the finger bends or flexes at the joints. As the adjacent segments pivot relative to each other, the band 86 at the top of each tenon is brought closer to the band 86 at the bottom of the adjacent tenon receiving slot. Thus, pivoting of the segments toward the palm of the robotic hand 10 shortens the length of the taut wire 74 housed in the palm side groove 70 of the finger. The excess length of wire 74 generated by the pivoting of the segments toward the palm of the robotic hand, is pulled into the hollow interior of the metacarpal segment 22.

Once the finger is bent toward the palm of the robotic hand, the finger can be extended by releasing tension on the palm side wire 74 and pulling on the backhand side wire 76. As the finger straightens, excess length of the backhand wire 76 is pulled into the hollow interior of the metacarpal segment 22.

Pulling of the palm side and the backhand wires 74 and 76 is accomplished by passing an electrical current through the memory wire coil, 24 and 26 respectively, to which they are attached. The electrical current causes the memory wire coil to resume its original shape. When assembling each finger, the memory wire 24 controlling the palm side wire 74 is installed after it is stretched to a length longer than its original length. The difference in length between the installed length and the original length should be equivalent to the excess length of the palm side wire 74 when the finger is fully curled. The coiled memory wire 26 controlling the backhand side wire 76 is installed in its original configuration. The aforementioned memory wire installation procedure is followed when the memory wires are installed with the finger fully extended.

When the finger is assembled as described above, it is initially fully extended. Electrically activating the memory wire 24 controlling the palm side wire 74, causes the memory wire to contract to its original length thus pulling the palm side wire 74 and curling the finger. As the finger curls, the coiled memory wire 26 controlling the backside wire 76 is stretched to a length longer than its original length. Ceasing electrical current supply to the memory wire 24 controlling the palm side wire 74 and applying electrical current to the coiled memory wire 26 controlling the backside wire 76, causes the memory wire controlling the backside wire to contract to its original shape which in turn causes the finger to move toward the extended position, and causes the memory wire 24 controlling the palm side wire 74 to stretch beyond its original length.

If the finger is being assembled in the curled configuration, the memory wire 24 controlling the palm side wire 74 is installed in its original configuration while the memory wire 26 controlling the backhand side wire 76 is installed in the stretched configuration. The coiled memory wires 24 and 26 used in the instant invention are of a commercially available type and are described in the literature mentioned previously.

Adjustment screws 88 are provided in the gap between adjacent segments. These adjustment screws ensure that the finger remains slightly bent at the joints even when it is fully extended. In this way the joints are prevented from locking up. The degree to which the finger is bent when in the fully extended configuration, can be adjusted by turning the adjustment screws 88 to set the distance to which the screws protrude into the gap between adjacent segments.

The robotic hand is assembled by putting the four fingers 14, 16, 18, and 20 adjacent to one another with all the palm side grooves 70 facing toward the same side of the hand 10. The side to which all the palm side grooves 70 face forms the palm of the hand 10, and the side to which all the backhand grooves 72 face forms the back of the hand. The four fingers are fixed together by first and second bolts 90 and 92 passing through all four metacarpal segments 22, 22a, and 22b. The first bolt 90 is located close to the bottom of the metacarpal segments, and the second bolt 92 is located further up the metacarpal segments. The bolts 90 and 92 are secured by nuts (not shown) that threadably engage the ends of the bolts. The nuts are tightened until the metacarpal segments 22, 22a, and 22b are squeezed together, causing the somewhat resilient metacarpal segments to deform slightly. Preferably, the nut on the first bolt 90 is closer to the head of the first bolt than the nut on the second bolt 92 is to the head of the second bolt, thus causing the fingers to have a splayed appearance reminiscent of the human hand.

One convenient way to fix the memory wires 24 and 26 to the interior of the metacarpal segments 22, 22a, and 22b, is to hook the ends of the memory wires 24 and 26 to the bolt 92. However if this is done care must be taken to ensure that the ends of the memory wires hooked to the bolt 92 are insulated so that no short circuit is created between the memory wires 24 and 26.

The first bolt 90 also acts as the pivot axis of the robotic hand relative to the forearm assembly 94. The metacarpal segments 22a and 22b of the index finger and the middle finger include slight modifications. The metacarpal segment 22b of the middle finger has a slot 96 at its bottom for receiving a tenon 98 of first forearm portion 100. The first bolt 90 passes through the tenon 98 of the first forearm portion when the tenon 98 is received within the slot 96 at the bottom of the metacarpal segment 22b of the middle finger. The first bolt 90 in cooperation with the tenon 98 of the first forearm portion and the slotted end of the metacarpal segment 22b of the middle finger, forms the wrist of the robotic arm 102.

At about the middle of the metacarpal segment 22a of the index finger there is a slot 104 that forms an acute angle with the longitudinal axis of the metacarpal segment 22a of the index finger. The slot 104 in the metacarpal segment of the index fingers is angled toward the tip of the index finger 14 and is the attachment point for the thumb 12.

The thumb 12 is made of two segments 106 and 108. The first segment 106 of the thumb 12 is identical to the proximal phalanx 34 of the fingers described previously. The first segment 106 of the thumb is pivotally joined to the metacarpal segment 22a of the index finger by a pivot pin which passes through the slot 104 in the medial portion of the metacarpal segment 22a of the index finger and the tenon 110 of the first segment 106 of the thumb. The end of the first segment 106, distal from the joint to the metacarpal segment 22a of the index finger, has a slot 112 for, receiving a tenon 114 of the second segment 108 of the thumb The second segment 108 is equivalent to the tip of the human thumb. The second segment 108 is pivotally joined to the first segment 106 by a pivot pin which passes through the slotted end off the first segment and the tenon 114 of the second segment. Just as with the finger tip segments 50, the thumb tip segment 108 has a depression 116 on the palm nice and a similar depression (not shown) on the backhand side. A groove 118 extends from the, depression 116 on the palm side along the length of the tenon 114 of the thumb tip segment 108. A second groove (not shown) extends from the depression on the back side along the length of the tenon 114 of the thumb tip segment 108.

The first thumb segment 106 has a groove 120 on the palm side extending from the bottom of the slot receiving the tenon 114 of the thumb tip segment, to the top of the tenon 110 of the first thumb segment. A second groove (not shown) extends from the bottom of the slot receiving the tenon 114 of the thumb tip segment to the top of the tenon 110 of the first thumb segment 106, on the back side of the first thumb segment. When the two segments forming the thumb are pivotally connected together, the grooves on the palm side of each of the two thumb segments register with one another, forming a continuous groove 122 running along the palm side of the thumb from the depression 116 in the thumb tip segment to the top of the tenon 110 of the first thumb segment. The grooves on the, backhand aide of the thumb also register with one another to form an essentially continuous groove running down the backhand side of the thumb 12.

Figure 4:
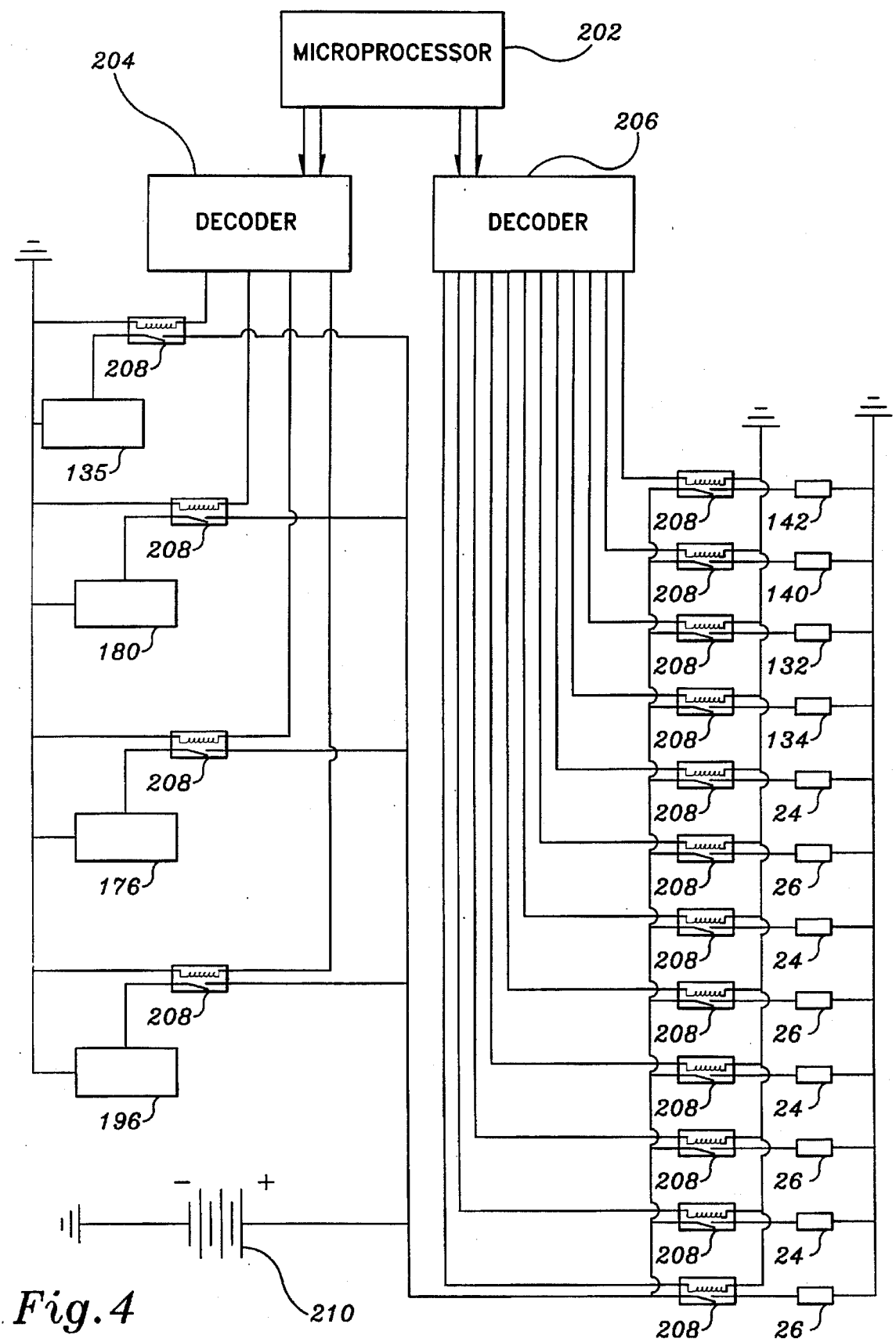
FIG. 4 is a schematic diagram of the control system for the robotic arm and hand of the present invention.

The thumb 12 has a first wire 74' housed in the palm sided groove 122, and a second wire housed in the groove running down the backhand side of the thumb 12. Each wire terminates in a flat ring 124 at one end. The ring 124 for each wire (74' in the case of the palm side wire) is anchored in the respective thumb tip depression; (116 in the case of the palm side) by a respective screw 126 passing through the ring 124 and threadably engaging a hole provided in the thumb tip depression. The other end of each wire (74' for the palm side) passes through a guide loop 128 fixed to the metacarpal of the middle finger and into a respective hollow memory wire housing 130. Two memory wire housings 130 are provided (only one shown), one on the palm of the hand and one on the back of the hand. The end of each wire passing into the respective memory wire housing 130 is then fixed to an end of a respective coiled memory wire. Referring to FIG. 4, the palm side memory wire controlling the thumb is referenced by numeral 132 and the backhand side memory wire controlling the thumb is referenced by numeral 134. The end of each memory wire 132 and 134, distal from the end attached to the wires anchored to the thumb tip, is anchored within the respective memory wire housing 130 using any well known means. Metal bands 86 provided at the top of each tenon and at the bottom of each tenon receiving slot retain the wires (74' for the palm side), anchored to the thumb tip, in their respective grooves.

The structures pertaining to the thumb on the back of the hand are not shown since they are essentially identical to the structures pertaining to the thumb seen on the palm of the hand. In addition, the backhand side of the thumb 12 is essentially identical to the backhand side of the combination of the distal phalanx 50 and the middle phalanx 42 as seen in FIG. 6.

As in the case of the four fingers, passing an electrical current through the memory wire 132 in the palm memory wire housing 130 curls the thumb toward the palm of the hand. Ceasing electrical current supply to the memory wire 132 in the palm memory wire housing 130 while supplying electrical current to the memory wire 134 in the backhand memory wire housing (not shown), extends the thumb.

In addition to the first forearm portion 100, the forearm assembly 94 includes a motor 135 having a motor housing 136, and a second forearm portion 138. As mentioned previously the hand 10 is pivotally attached to one end of the first forearm portion 100. The other end of the first forearm portion 100 is fixed to they motor housing 136.

The robotic hand 10 can be pivoted at the wrist by first and second pairs of linear motors 140 and 142. The linear motors 140 and 142 are of a commercially available type, and include a telescoping member supported within a cylindrical housing inside the housing is a coiled memory wire attached to the telescoping member at one end and fixed to the housing at the other end. Electrical activation of the memory wire causes axial movement of the telescoping member into or out of the housing. The linear motor is discussed in the literature mention previously and will not be discussed in more detail herein.

The first pair of linear motors 140 pivotably attach, at one end, to a flange 144 which is fixed to the motor housing 136. The first pair of linear motors 140 attach to a yoke 146 at the other end. A line 148 is attached to the yoke 146 at one end. The other end of the line 148 partially wraps around the first bolt 90 and is fixed thereto. Since the hand 10 is fixed to the first bolt 90 and rotates therewith, contraction of the first pair of linear motors 140 causes the hand to pivot toward the forearm assembly 94 with the palm of the hand leading.

Similarly, the second pair of linear motors 142 pivotally attach to the flange 144 at one end. The second pair of linear motors 142 attach to a second yoke 150 at the other end. A line 152 is attached to the yoke 150 at one end. The other end of the line 152 partially wraps around the first bolt 90, in a direction opposite to that of the line 148, and is fixed to the bolt 90. Since the hand is fixed to the first bolt 50 and rotates therewith, contraction of the second pair of linear motors 142 causes the hand to pivot toward the forearm assembly 94 with the back of the hand 10 leading. As an alternative, each of the lines 148 and 152 can be attached to the metacarpal segments of the hand 10 on the same side as the respective pair of linear motors 140 and 142. Lines 148 and 150 can be made of any suitable material including but not limited to wire, cable, rope, String, woven or monofilament cord. Similarly, the wires anchored to the tips of the digits including wires 74, 74', and 76 can be made of any of the same materials.

The second portion of the forearm assembly 138 is fixed at one end to the output shaft of the motor 135. The motor 135 and the motor housing 136 are fixedly attached to one another and as a result rotate together. Thus when motor 135 is turned on, the first and second forearm portions 100 and 138 rotate relative to one another, i.e. the wrist of the robotic arm twists about the longitudinal axis of the forearm assembly 94. If the rotational speed of the motor 135 is excessive for the required torque, a speed reduction gear train fixed to the motor housing 136 and driven by the output shaft of the motor 135 can be used to provide the required torque at a manageable rate of twisting of the wrist. The second forearm portion 138 would then be fixed to the output shaft of the gear train directly, or via a ring gear fixed to the second forearm portion 138 and engaging a planetary gear moving with the motor housing 136.

The other end of the second forearm portion 138 is fixed to and rotates with shaft 154. A sprocket 156 is also fixed to the shaft 154 and rotates therewith. Shaft 154 is rotatably supported by beams 158 and 160. Beams 158 and 160 are fixed together by rods 162 and 164 and move as a unit. Beams 158 and 160 are rotationally fixed at one end to shaft 166 and pivot responsive to rotation of the shaft 166. Shaft 166 is rotatably supported by a cage 168. A large sprocket 170 is fixed to shaft 166 and rotates therewith. A small sprocket 172 and a large sprocket 174 are rotatably supported by shaft 166, i.e. sprockets 172 and 174 can rotate freely about shaft 166. Sprocket 172 and sprocket 174 are fixed together, and thus they rotate together relative to shaft 166. The cage 168 also supports a first motor 176. Motor 176 drives a sprocket (not shown) which engages chain 178. The chain 178 drives sprocket 170, thus energizing motor 176 pivots the robotic arm about the longitudinal axis of shaft 166.

In addition, the cage 168 supports a second motor 180. Motor 180 drives a sprocket 182 which engages chain 184. The chain 184 drives sprocket 174. Sprocket 172 rotates with sprocket 174, thus driving chain 186. The chain 186 drives sprocket 156 which in turn causer rotation of shaft 154. Since the forearm assembly 94 is fixed to shaft 154 and rotates therewith, energizing motor 180 pivots the forearm assembly 94 about the longitudinal axis of shaft 154. In other words, energizing motor 180 bends the robotic arm at the "elbow".

The cage 168 is fixed to bracket 188. The bracket 188 is supported by and rotates with shaft 190. The shaft 190 is rotatably supported by a base 192. A sprocket 194 is fixed to and rotates with shaft 190. The base 192 also supports a motor 196. The motor 196 drives a sprocket 198 which engages chain 200. The chain 200 drives sprocket 194, therefore energizing motor 196 rotates the robotic arm 102 about the longitudinal axis of shaft 190. Thus, the robotic arm of the present invention is capable off 360° traverse.

Referring to FIG. 4, the control system for the robotic arm of the present invention can be seen. The robotic arm of the present invention can be programmed to execute any desired movement. The microprocessor 202 is programmed to supply codes in the desired sequence and with the desired timing to the decoders 204 and 206. Each code supplied by the microprocessor 202 uniquely identifies one of the reed switches 208. Each reed switch 208 controls electrical current supply to a respective memory wire or motor 24, 26, 132, 134, 135, 140, 142, 176, 180, and 196. Thus microprocessor 202 can control the timing and sequence in which the memory wires 24, 26, 132, and 134 and the motors 135, 140, 142, 176, 180, and 196 are energized. Therefore microprocessor 202 can cause the robotic arm to execute the movements desired by the user of the robotic arm.

Power supply 210 supplies the energy for activating memory wires or motors 24, 26, 132, 134, 135, 140, 142, 176, 180, and 196. Although power supply 210 is a battery in the illustrated example, any sufficiently powerful power supply can be used with the robotic arm of the present invention.

Although in the illustrated example two memory wires have been provided for each digit, finer control of the movements of the robotic hand can be obtained by providing a pair of oppositely acting memory wires for each joint of each digit. In this way, independent pivoting at each joint of each digit can be obtained if desired.

It is to be understood that the present invention is not limited to the sole embodiment described above, but encompasses any and all embodiments within the scope of the following claims.

I claim:

1. A robotic hand comprising:

at least one finger, said finger having a proximal segment and a distal segment, said distal segments being pivotably attached to said proximal segment;

first and second actuating lines, each of said actuating lines having a first and a second end, each said first end of each said actuating line being anchored to said distal segment;

means for supporting said first and second actuating lines on said distal segment; and first and second memory wires, each of said memory wires having a first and a second end, each said first end of each memory wire being fixed to said proximal segment, and each said second end of each memory wire being attached to each said second end of each actuating line, whereby electrical activation said first memory wire moves said at least one finger toward is curled configuration and electrical activation of said second memory wire moves said at least one finger toward an extended configuration.

2. The robotic hand according to claim 1, wherein said at least one finger is an index finger, and said robotic hand further includes a middle finger, a ring finger, a pinky finger, and a thigh, so as to resemble a human hand.

3. The robotic hand according to claim 2, wherein each of said index ringer, said middle finger, said ring finger, and said pinky finger include a first segment, a second segment pivotably attached to said first segment at a first joint, a third segment pivotably attached to said second segment at a second joint, and a fourth segment pivotably attached to said third segment at a third joint, and said thumb includes a first thumb segment pivotably attached to said first segment of said index finger at a first thumb joint and a thumb tip segment pivotably attached to said first thumb segment at a second thumb joint, said first sequent of said index finger being said proximal segment and said fourth segment being said distal segment.

4. The robotic hand according to claim 3, wherein each of said index finger, said middle finger, said ring finger, said pinky finger, and said thumb are independently movable between a curled configuration and an extended configuration, is a means for supporting said first actuating line of said index finger on said third segment of said index finger, means for supporting said first actuating line of said index finger on said second segment of said index finger, means for supporting said second actuating line of said index finger on said third segment of said index finger, and means for supporting said second actuating line of said index finger on said second segment of said index finger, whereby electrical activation of said first memory wire of said index finger moves said index finger toward said curled configuration of said index finger and electrical activation of said second memory wire of said index finger moves said index finger toward said extended configuration of said index finger, said middle finger further including a first memory wire, a second memory wire, a first actuating line and a second actuating line, said first memory wire of said middle finger having first and second ends, said second memory wire of said middle finger having first and second ends, said first actuating line of said middle finger having first and second ends, said second actuating line of said middle finger having first and second ends, said first end of said first actuating line of said middle finger being anchored to said fourth segment of said middle finger, said second end of said first actuating line of said middle finger being attached to said second end of said first memory wire of said middle finger, said first end of said first memory wire of said middle finger being anchored to said first segment of said middle finger, said first end of said second actuating line of said middle finger being anchored to said fourth segment of said middle finger, said second end of said second actuating line of said middle finger being attached to said second end of said second memory wire of said middle finger, said first end of said second memory wire of said middle finger being anchored to said first segment of said middle finger, means for supporting said first actuating line of said middle finger on said fourth segment of said middle finger, means for supporting said first actuating line of said middle finger on said third segment of said middle finger, means for supporting said first actuating line of said middle finger on said second segment of said middle finger, means for supporting said second actuating line of said middle finger on said fourth segment of said middle finger, means for supporting said second actuating line of said middle finger on said third segment of said middle finger, and means for supporting said second actuating line of said middle finger on said second segment of said middle finger, whereby electrical activation of said first memory wire of said middle finger moves said middle finger toward said curled configuration of said middle finger and electrical activation of said second memory wire of said middle finger moves said middle finger toward said extended configuration of said middle finger, said ring finger further including a first memory wire, a second memory wire, a first actuating line and a second actuating line, said first memory wire of said ring finger having first and second ends, said second memory wire of said ring finger having first and second ends, said first actuating line of said ring finger having first and second ends, said second actuating line of said ring finger having first and second ends, said first end of said first actuating line of said ring finger being anchored to said fourth segment of said ring finger, said second end of said first actuating line of said ring finger being attached to said second end of said first memory wire of said ring finger, said first end of said first memory wire of said ring finger being anchored to said first segment of said ring finger, said first end of said second actuating line of said ring finger being anchored to said fourth segment of said ring finger, said second end of said second actuating line of said ring finger being attached to said second end of said second memory wire of said ring finger, said first end of said second memory wire of said ring finger being anchored to said first segment of said ring finger, means for supporting said first actuating line of said ring finger on said fourth segment of said ring finger, means for supporting said first actuating line of said ring finger on said third segment of said ring finger, means for supporting said first actuating line of said ring finger on said second segment of said ring finger, means for supporting said second actuating line of said ring finger on said fourth segment of said ring finger, means for supporting said second actuating line of said ring finger on said third segment of said ring finger, and means for supporting said second actuating line of said ring finger on said second segment of said ring finger, whereby electrical activation of said first memory wire of said ring finger moves said ring finger toward said curled configuration of said ring finger and electrical activation of said second memory wire of said ring finger moves said ring finger toward said extended configuration of said ring finger, said pinky finger further including a first memory wire, a second memory wire, a first actuating line and a second actuating line, said first memory wire of said pinky finger having first and second ends, said second memory wire of said pinky finger having first and second ends, said first actuating line of said pinky finger having first and second ends, said second actuating line of said pinky finger having first and second ends, said first end of said first actuating line of said pinky finger being anchored to said fourth segment of said pinky finger, said second end of said first actuating line of said pinky finger being attached to said second end of said first memory wire of said pinky finger, said first end of said first memory wire of said pinky finger being anchored to said first segment of said pinky finger, said first end of said second actuating line of said pinky finger being anchored to said fourth segment of said pinky finger, said second end of said second actuating line of said pinky finger being attached to said second end of said second memory wire of said pinky finger, said first end of said second memory wire of said pinky finger being anchored to said first segment of said pinky finger, means for supporting said first actuating line of said pinky finger on said fourth segment of said pinky finger, means for supporting said first actuating line of said pinky finger on said third segment of said pinky finger, means for supporting said first actuating line of said pinky finger on said second segment of said pinky finger, means for supporting said second actuating line of said pinky finger on said fourth segment of said pinky finger, means for supporting said second actuating line of said pinky finger on said third segment of said pinky finger, and means for supporting said second actuating line of said dinky finger on said second segment of said pinky finger, whereby electrical activation of said first memory wire of said pinky finger moves said pinky finger toward said curled configuration of said pinky finger and electrical activation of said second memory wire of said pinky finger moves said pinky finger toward said extended configuration of said pinky finger, and said thumb further including a first memory wire, a second memory wire, a first actuating line and a second actuating line, said first memory wire of said thumb having first and second ends, said second memory wire of said thumb having first and second ends, said first actuating line of said thumb having first and second ends, said second actuating line of said thumb having first and second ends, said first end of said first actuating line of said thumb being anchored to said thumb tip segment, said second end of said first actuating line of said thumb being attached to said second end of said first memory wire of said thumb, said first end of said first memory wire of said thumb being anchored to a palm side memory wire housing, said first end of said second actuating line of said thumb being anchored to said thumb tip segment, said second end of said second actuating line of said thumb being attached to said second end of said second memory wire of said thumb, said first end of said second memory wire of said thumb being anchored to a backhand side memory wire housing, means for supporting said first actuating line of said thumb on said thumb tip segment, means for supporting said first actuating line of said thumb on said first thumb segment, means for supporting said second actuating line of said thumb on said thumb tip segment, means for supporting said second actuating line of said thumb on said first thumb segment, whereby electrical activation of said first memory wire of said thumb moves said thumb toward said curled configuration of said thumb and electrical activation of said second memory wire of said thumb moves said thumb toward said extended configuration of said thumb.

5. The robotic hand according to claim 4, wherein each of said second, third, and fourth segments of said index finger, said second, third, and fourth segments of said middle finger said second, third, and fourth segments of said ring finger, said second, third, and fourth segments of said pinky finger, said first thumb segment, and said thumb tip segment have a palm side groove and a backhand side groove, said means for supporting said first actuating line of said index finger on said fourth segment of said index finger includes said palm side groove of said fourth segment of said index finger and a first annular band provided on said fourth segment of said index finger adjacent said third joint of said index finger, said means for supporting said first actuating line of said index finger on said third segment of said index finger includes said palm side groove of said third segment of said index finger and second and third annular bands provided on said third segment of said index finger adjacent said third and second joints of said index finger respectively, said means for supporting said first actuating line of said index finger on said second segment of said index finger includes said palm side groove of said second segment of said index finger and fourth and fifth annular bands provided on said second segment of said index finger adjacent said second and first joints of said index finger respectively, said means for supporting said second actuating line of said index finger on said fourth segment of said index finger includes said backhand side groove of said fourth segment of said index finger and said first annular band provided on said fourth segment of said index finger adjacent said third joint of said index finger, said means for supporting said second actuating line of said index finger on said third segment of said index finger includes said backhand side groove of said third segment of said index finger and said second and third annular bands provided on said third segment of said index finger adjacent said third and second joints of said index finger respectively, said means for supporting said second actuating line of said index finger on said second segment of said index finger includes said backhand side groove of said second segment of said index finger and said fourth and fifth annular bands provided on said second segment of said index finger adjacent said second and first joints of said index finger respectively, said means for supporting said first actuating line of said middle finger on said fourth segment of said middle finger includes said palm side groove of said fourth segment of said middle finger and a sixth annular band provided on said fourth segment of said middle finger adjacent said third joint of said middle finger, said means for supporting said first actuating line of said middle finger on said third segment of said middle finger includes said palm side groove of said third segment of said middle finger and seventh and eighth annular bands provided on said third segments of said middle finger adjacent said third and second joints of said middle finger respectively, said means for supporting said first actuating line of said middle finger on said second segment of said middle finger includes said palm side groove of said second segment of said middle finger and ninth and tenth annular bands provided on said second segment of said middle finger adjacent said second and first joints of said middle finger respectively, said means for supporting said second actuating line of said middle finger on said fourth segment of said middle finger includes said backhand side groove of said fourth segment of said middle finger and said sixth annular band provided on said fourth segment of said middle finger adjacent said third joint of said middled finger, said means for supporting said second actuating line of said middle finger on said third segment of said middle finger includes said backhand side groove of said third segment of said middled finger and said seventh and eighth annular bands provided on said third segment of said middle finger adjacent said third and second joints of said middle finger respectively, said means for supporting said second actuating line of said middle finger on said second segment of said middle finger includes said backhand side groove of said second segment of said middle finger and said ninth and tenth annular bands provided on said second segment of said middle finger adjacent said second and first joints of said middle finger respectively, said means for supporting said first actuating line of said ring finger on said fourth segment of said ring finger includes said palm side groove of said fourth segment of said ring finger and an eleventh annular band provided on said fourth segment of said ring finger adjacent said third joint of said ring finger, said means for supporting said first actuating line of said ring finger on said third segment of said ring finger includes said palm side groove of said third segment of said ring finger and twelfth and thirteenth annular bands provided on said third segment of said ring finger adjacent said third and second joints of said ring finger respectively, said means for supporting said first actuating line of said ring finger on said second segment of said ring finger includes said palm side groove of said second segment of said ring finger and fourteenth and fifteenth annular bands provided on said second segment of said ring finger adjacent said second and first joints of said ring finger respectively, said means for supporting said second actuating line of said ring finger on said fourth segment of said ring finger includes said backhand side groove of said fourth segment of said ring finger and said eleventh annular band provided on said fourth segment of said ring finger adjacent said third joint of said ring finger, said means for supporting said second actuating line of said ring finger on said third segment of said ring finger includes said backhand side groove of said third segment of said ring finger and said twelfth and thirteenth annular bands provided on said third segment of said ring finger adjacent said third and second joints of said ring finger respectively, said means for supporting said second actuating line of said ring finger on said second segment of said ring finger includes said backhand side groove of said second segment of said ring finger and said fourteenth and fifteenth annular bands provided on said second segment of said ring finger adjacent said second and first joints of said ring finger respectively, said means for supporting said first actuating line of said pinky finger on said fourth segment of said pinky finger includes said palm side groove of said fourth segment of said pinky finger and a sixteenth annular band prodded on said fourth segment of said pinky finger adjacent said third joint of said pinky finger, said means for supporting said first actuating line of said pinky finger on said third segment of said pinky finger includes said palm side groove of said third segment of said pinky finger and seventeenth and eighteenth annular bands provided on said third segment of said pinky finger adjacent said third and second joints of said pinky finger respectively, said means for supporting said first actuating line of said pinky finger on said second segment of said pinky finger includes said palm side groove of said second segment of said pinky finger and nineteenth and twentieth annular bands provided on said second segment of said pinky finger adjacent said second and first joints of said pinky finger respectively, said means for supporting said second actuating line of said pinky finger on said fourth segment of said pinky finger includes said backhand side groove of said fourth segment of said pinky finger and said sixteenth annular band provided on said fourth segment of said pinky finger adjacent said third joint of said pinky finger, said means for supporting said second actuating line of said pinky finger on said third segment of said pinky finger includes said backhand side groove of said third segment of said pinky finger and said seventeenth and eighteenth annular bands provided on said third segment of said pinky finger adjacent said third and second joints of said pinky finger respectively, said means for supporting said second actuating line of said pinky finger on said second segment of said pinky finger includes said backhand side groove of said second segment of said pinky finger and said nineteenth and twentieth annular hands provided on said second segment of said pinky finger adjacent said second and first joints of said pinky finger respectively, said means for supporting said first actuating line of said thumb on said thumb tip segment includes said palm side groove of said thumb tip segment and a twenty first annular band provided on said thumb tip segment adjacent said second thumb joint, said means for supporting said first actuating line of said thumb on said first thumb segment includes said palm side groove of said first thumb segment and twenty second and twenty third annular bands provided on said first thumb segment adjacent said second and said first thumb joints respectively, said means for supporting said second actuating line of said thumb on said thumb tip segment includes said backhand side groove of said thumb tip segment and said twenty first annular band provided on said thumb tip segment adjacent said second thumb joint, and said means for supporting said second actuating line of said thumb on said first thumb segment includes said backhand side groove of said first thumb segment and said twenty second and twenty third annular bands provided on said first thumb segment adjacent said second and said first thumb joints respectively.

6. The robotic hand according to claim 5, further including:

a bolt passing through each of said first segment of said index finger, said first segment of said middle finger, said first segment of said ring finger, and said first segment of said pinky finger proximate an end of each of said first segment of said index finger, said first segment of said middle finger, said first segment of said ring finger, and said first segment of said pinky finger distal from said first joint of each of said index finger, said middle finger, said ring finger, and said pinky finger;

a first forearm portion having first and second ends, said hand being pivotally attached to said first end of said first forearm portion by having said bolt rotatably supported by said first end of said first forearm portion;

a first motor fixedly attached to a motor housing, said first motor having an output shaft, said motor housing being fixedly attached to said second end of said first forearm portion;

a second forearm portion having first and second ends, said first end of said second forearm portion being linked to said output shaft of said first motor, whereby energizing said first motor causes relative rotational motion between said first forearm portion and said second forearm portion.

7. The robotic hand according to claim 6, further including:

a first memory wire actuated linear motor having first and second ends, said first end of said first memory wire actuated linear motor being translationally fixed relative to said motor housing, said second end of said first memory wire actuated linear motor being linked to said hand such that energizing said first memory wire actuated linear motor causes said hand to pivot relative to said first forearm portion in a first direction; and a second memory wire actuated linear motor having first and second ends, said first end of said second memory wire actuated linear motor being translationally fixed relative to said motor housing, said second end of said second memory wire actuated linear motor being linked to said hand such that energizing said second memory wire actuated linear motor causes said hand to pivot relative to said first forearm portion in a second direction opposite to said first direction.

8. The robotic hand according to claim 7, further including:

a first shaft fixedly attached to said second end of said second forearm portion;

a first sprocket fixedly attached to said first shaft;

a beam having first and second ends, said rotatably supporting said first shaft at said first end thereof, said beam fixedly attached to a second shaft at said second end thereof;

a second sprocket fixed to said second shaft and rotatable therewith;

first and second idler sprockets fixed together and rotatably supported by said second shaft;

a first chain linking said first idler sprocket to said first sprocket;

a frame rotatably supporting said second shaft, said frame supporting second and third motors, said second motor driving said, second sprocket and said third motor driving said second idler sprocket, whereby energizing said second motor causes said beam to pivot about said second shaft, and energizing said third motor cause said second forearm portion to pivot about said first shaft.

9. The robotic hand according to claim 8, further including:

a third shaft having a longitudinal axis and being fixedly attached to said frame, said third shaft being perpendicular to said second shaft and said first shaft, said third shaft rotatably supported in a support base; and a fourth motor housed within said support base and driving said third shaft, whereby energizing said fourth motor rotates said frame about said longitudinal axis of said third shaft.

10. The robotic hand according to claim 9, further including:

a control system controlling said robotic arm to execute a predetermined sequence of movements, said control system including a microprocessor supplying a sequence of codes corresponding to the predetermined sequence of movements to a decoder circuit, each of said codes uniquely identifying one of a plurality of switches, said decoder closing and opening said plurality of switches responsive to said codes, each of said plurality of switches controlling power supply to a respective one of said first and second memory wires of the index finger, said first and second memory wires of the middle finger, said first and second memory wires of the ring finger, said first and second memory wires of the pinky finger, said first and second memory wires of the thumb, said first memory wire actuated linear motor, said second memory wire actuated linear motor, and said first, second, third, and fourth motors, whereby the predetermined sequence of movements is executed by said robotic arm.

11. A robotic arm comprising:

a hand including:

at least one finger, said finger having a first and a second segment, said second segment being pivotably attached to said first segment;

an actuating line supported by said first segment and said second segment such that pulling of said actuating line causes said first segment and said second segment to pivot relative to one another;

a memory wire having first and second ends, said memory wire having said first end thereof fixed relative to one of said first segment and said second segment, and said memory wire having said second end thereof attached to said actuating line; and a bolt;

a first forearm portion having first and second ends said hand being pivotably attached to said first end of said first forearm portion by having said bolt rotatably supported by said first end of said first forearm portion;

a first motor fixedly attached to a motor housing, said first motor having an output shaft, said motor housing being fixedly attached to said second end of said first forearm portion;

a second forearm portion having first and second ends, said first end of said second forearm portion being linked to said output shaft of said first motor;

a first memory wire actuated linear motor having first and second ends, said first end of said first memory wire actuated linear motor being translationally fixed relative to said motor housing, said second end of said first memory wire actuated linear motor being linked to said hand such that energizing said first memory wire actuated linear motor causes said hand to pivot relative to said first forearm portion in a first direction; and a second memory wire actuated linear motor having first and second ends, said first end of said second memory wire actuated linear motor being translationally fixed relative to said motor housing, said second end of said second memory wire actuated linear motor being linked to said hand such that energizing said second memory wire actuated linear motor causes said hand to pivot relative to said first forearm portion in a second direction opposite to said first direction, whereby energizing said first motor causes relative rotational motion between said first foreman portion and said second forearm portion.

12. The robotic arm according to claim 11, further including:

a first shaft fixedly attached to said second end of said second forearm portion;

a first sprocket fixedly attached to said first shaft;

a beam having first and second ends, said beam rotatably supporting said first shaft at said first end thereof, said beam fixedly attached to a second shaft at said second end thereof;

a second sprocket fixed to said second shaft and rotatable therewith;

first and second idler sprockets fixed together and rotatably supported by said second shaft;

a first chain linking said first idler sprocket to said first sprocket;

a frame rotatably supporting said second shaft, said frame supporting second and third motors, said second motor driving said second sprocket and said third motor driving said second idler sprocket, whereby energizing said second motor causes said beam to pivot about said second shaft, and energizing said third motor causes said second forearm portion to pivot about said first shaft.

13. The robotic arm according to claim 12, further including:

a third shaft having a longitudinal axis and being fixedly attached to said frame, said third shaft being perpendicular to said second shaft and said first shaft, said third shaft rotatably supported in a support base; and a fourth motor housed within said support base and driving said third shaft, whereby energizing said fourth motor rotates said frame about said longitudinal axis of said third shaft.

14. The robotic arm according to claim 13, further including:

a control system controlling said robotic arm to execute a predetermined sequence of movements, said control system including a microprocessor supplying a sequence of codes corresponding to the predetermined sequence of movements to a decoder circuit, each of said codes uniquely identifying one of a plurality of switches, said decoder closing and opening said plurality of switches responsive to said codes, each of said plurality of switches controlling power supply to a respective one of said memory wire, said first memory wire actuated linear motor, said second memory wire actuated linear motor, and said first, second, third, and fourth motors, whereby the predetermined sequence of movements is executed by said robotic arm.

* * * * *